May 17, 1932.  R. W. CANFIELD  1,859,230
MANUFACTURE OF HOLLOW GLASSWARE
Filed March 1, 1929  2 Sheets-Sheet 1
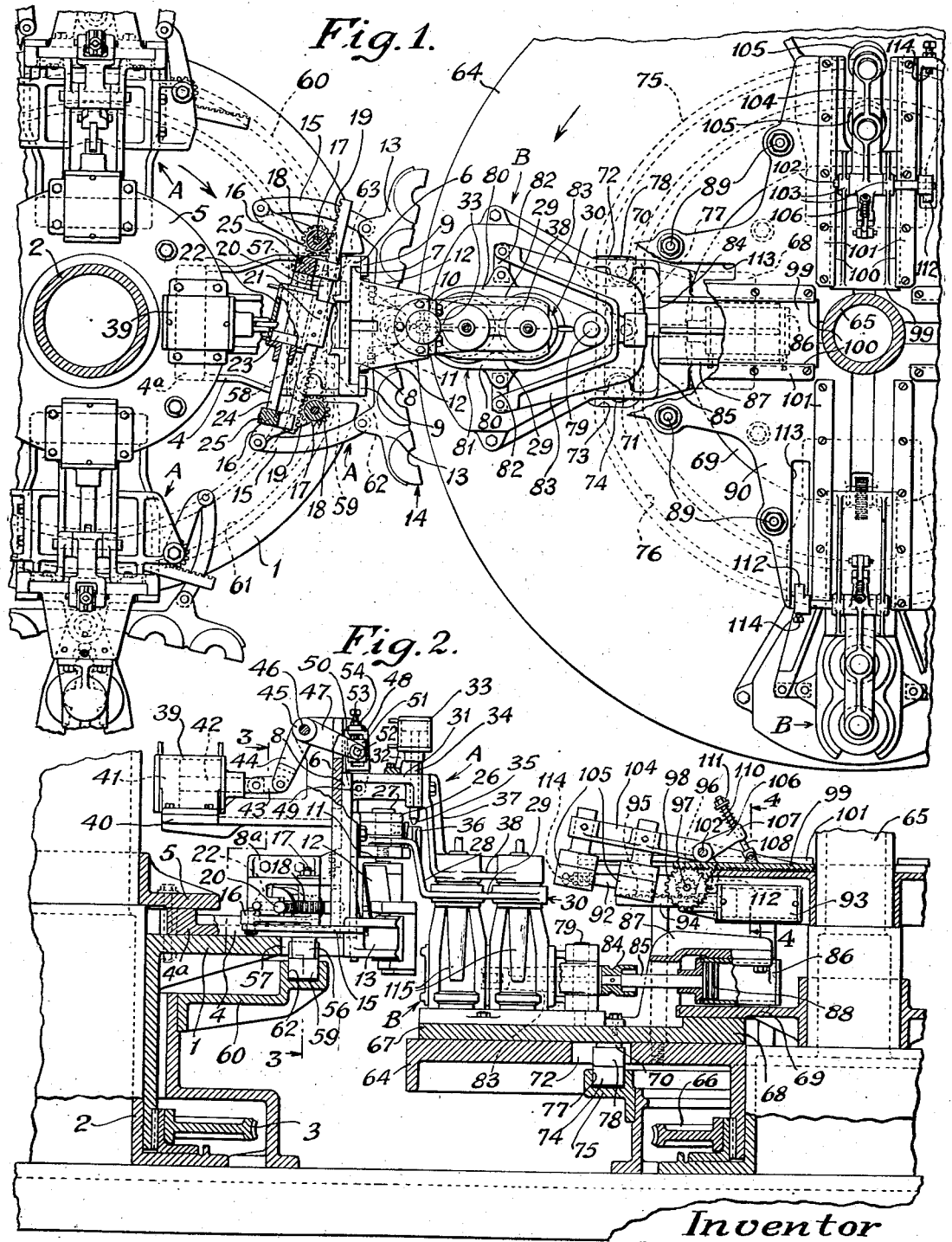
Witness:
A. A. Horn
Inventor
Robert W. Canfield
by Brown & Parham
Attorney.

May 17, 1932.  R. W. CANFIELD  1,859,230
MANUFACTURE OF HOLLOW GLASSWARE
Filed March 1, 1929  2 Sheets-Sheet 2
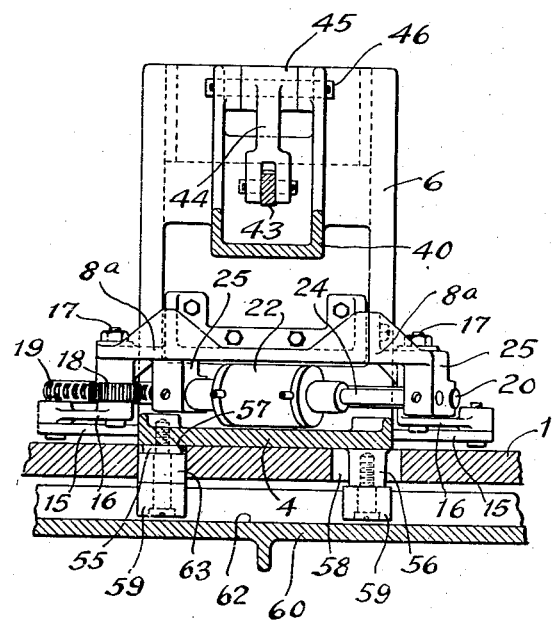
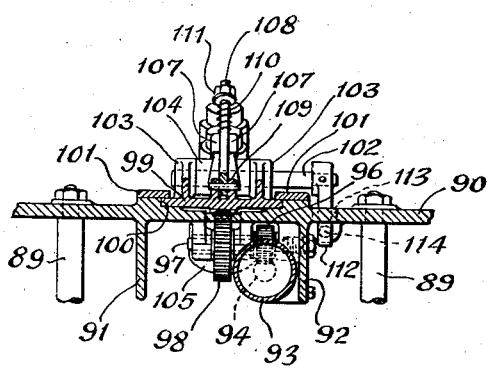
Witness:
A. A. Horn
Inventor
Robert W. Canfield
by Brown & Parham
Attorney.

Patented May 17, 1932

1,859,230

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF HOLLOW GLASSWARE

Application filed March 1, 1929. Serial No. 343,614.

My invention relates generally to the manufacture of hollow glassware and more particularly to glassware forming apparatus of the type having plural cavity preliminary or parison forming molds and plural cavity finishing or blow molds, the glass for each article being given a preliminary shape in a preliminary mold and then transferred to a finishing mold in which the formation thereof is completed.

Apparatus for the manufacture of hollow glassware may comprise two adjacent tables arranged to rotate in opposite directions. A plurality of glass receiving and parison forming units may be provided on one of such tables and a like number of finishing or blow molds may be provided on the other table. Each of the parison forming units may comprise a divided parison body forming mold with which a divided neck mold or ring and other associated parts cooperate to form a glass charge into a parison having a neck portion. The parison thus formed may be suspended from the divided neck mold after the parison body mold has opened to permit the halves of a divided blow mold on the blow mold table to be closed about the body of the parison at the proper time in the cycles of rotation of the two tables for the transfer of the parison to the blow mold, the neck mold being opened to release the parison after the blow mold has been closed. It has been proposed, as disclosed in Patent No. 1,833,302, granted to Karl E. Peiler, November 24, 1931, and in his copending application Serial No. 323,955, filed December 5, 1928, to transfer a parison from the single cavity parison mold unit on one continuously rotating table to a single cavity blow mold on the associated continuously rotating table.

An object of the present invention is to provide efficient and reliable glass forming apparatus of the two-table type having plural cavity parison forming mold units and plural cavity finishing molds and adapted to effect the transfer of parisons from the plural cavity parison mold units to the plural cavity blow molds without stopping the rotation of the tables on which such molds are supported.

A further object of the invention is to provide an efficient and reliable glass forming apparatus of the two-table type adapted to effect a transfer of parisons from the parison molds to the blank molds without stopping the rotation of the tables on which the molds are supported, and while causing the parisons and the blow molds to travel in coincident substantially straight lines, perpendicular to the radii of the tables through the point at which the tables most nearly approach each other.

A further object of the invention is to provide improved mechanism for opening and closing the parison body molds at the proper times in the cycle of rotation of the parison mold supporting table.

A still further object of the invention is a provision in apparatus of the character described of improved blow head and blow head operating mechanism for cooperating with a plural cavity blow mold on a rotating table.

It also is an object of the invention to provide a novel method of manufacturing glassware wherein a plurality of parisons are formed in a plural cavity parison mold unit on a carrier traveling about one center, the parisons thus formed being transferred to a plural cavity blow mold unit on another carrier traveling about a different center while both mold units are moving.

Another object of the invention is to provide a novel glassware forming machine of the type in which a parison mold travels about one center and a blow mold travels about a different center, characterized by the provision of mechanism for transferring a parison from the parison mold to the blow mold while the molds are moving, and arranged to prevent relative rotation between the parison and the blow mold while the blow mold is closing about the parison in effecting the transfer.

Further objects and advantages of the invention will be apparent from the following description when it is considered in conjunction with the accompanying drawings.

According to the invention, a plurality of similar plural cavity glass receiving and parison forming units are mounted on a rotary table so that each of such units has limited controlled movements independently of the table while traveling with the latter. Each of the glass receiving and parison forming units may comprise a divided parison body mold having plural cavities and a divided plural cavity neck mold. A plural head structure also may be provided for covering the cavities of the closed neck mold. This parison forming unit may be charged with glass by the well-known suction method, the parison body mold and neck mold as well as the head structure of each unit being supported for movement vertically so that the closed parison body mold may be lowered at the proper time in the cycle of rotation of the supporting table to position to contact with the surface of the glass of a gathering pool, suction then being applied from the head structure through the cavities of the closed neck mold into the plural cavities of the parison body mold to draw glass thereinto for filling the plural cavities of the parison body and neck molds. The unit then is raised from the glass and the gathered glass may be severed by any suitable severing mechanism, such, for example, as that disclosed in Patent 1,572,143, granted to G. E. Howard, Feb. 9, 1926. The rotation of the table will carry the charged glass receiving and parison forming unit away from the gathering pool and a bottom plate may be employed to close the lower ends of the cavities of the parison body mold to permit the application of positive pressure through the head structure and the neck mold to expand the glass in the cavities of the parison forming units to preliminary form.

A blow mold table may be arranged to rotate adjacent to the parison mold table at the side of the latter opposite from the gathering pool. The blow mold table may carry divided plural cavity blow molds corresponding in number and relative arrangement on the blow mold table with the glass receiving and parison forming units on the parison mold table. Each of the parison mold units and the corresponding blow mold are mounted for controlled movements horizontally on their respective tables while travelling with the latter so that corresponding parison forming units and blow molds may be caused to move along parallel paths during the portions of the cycles of rotations of the two tables required for the transfer of the parisons from the parallel cavities of the parison mold units to the parallel cavities of the corresponding divided blow molds on the blow mold table.

In the drawings:

Figure 1 is a fragmentary plan view of a two-table glassware forming machine embodying the invention, with parts broken away to disclose underlying parts and with other parts shown in horizontal section, the view showing the relative positions of cooperative parison forming units and blow molds during the transfer of parisons from one of such parison forming units to the corresponding blow mold;

Fig. 2 is a fragmentary vertical section through the forming machine of Fig. 1, certain portions of such machine being shown in elevation and other portions being broken away for clearness;

Fig. 3 is a relatively enlarged fragmentary sectional view taken substantially along the line 3—3 of Fig. 2, and Fig. 4 is a view similar to Fig. 3 but taken substantially along the line 4—4 of Fig. 2.

The practical embodiment of the invention illustrated in the drawings comprises a parison mold table 1, arranged to rotate about the axis of the vertical column 2. The table 1 may be rotated in any suitable known manner, a gear 3 being shown in Fig. 2 as applied to the hub portion of the table 1 for imparting rotary movement thereto.

The table 1 carries a plurality of glass receiving and parison forming units, indicated generally by A. The following description is of one of such units and of associated supporting and operating mechanism. A horizontally slidable supporting plate or carrier 4 rests on the table and has its inner end portion 4a disposed between the table 1 and a hold down plate 5. The latter surrounds the column 2 and may rotate in unison with the table. The carrier 4 thus may slide on the table without the inner end thereof being tilted upward by the weight of the parts on the outer portion of the carrier. The outer end portion of the slide plate 4 carries an upstanding supporting member 6, which, as shown to advantage in Fig. 1, may be channel shaped in cross section and is formed to provide a vertical slideway 7 for a vertically slidable plate 8 that may be retained in a slideway 7 by the retaining strips 9. The vertically movable slide plate 8 carries a bracket 10 on which is mounted a vertical pivot element 11. The arms 12 of holders 13 of the half sections of a plural cavity parison body mold generally indicated at 14, are pivotally supported on the pivot element 11. Links 15 pivotally connect the parison body mold holders 13 with rocker arms 16 on rock shafts 17. The rock shafts 17 are journaled in bearings on brackets 8a which are carried by the vertically movable slide plate 8 and are provided with pinions 18 which mesh with teeth 19 in the opposite edges of the opposite end portions of a longitudinally reciprocable bar 20. The bar 20 is fixed to a lateral extension 21 on a longitudinally reciprocable pressure fluid cylinder 22. The latter cooperates with a stationary piston 23 disposed therewithin, such piston being supported by a rod 24 which protrudes from opposite ends of the cylinder and has its ends supported by hanger members 25 which may be carried by the brackets 8a. With the arrangement just described, pressure admitted and exhausted to opposite ends of the cylinder 22 alternately will cause reciprocation of the cylinder and the bar 20 as a unit, thereby causing rotation of the pinions 18 in opposite directions and opening and closing the sections of the parison body mold.

The vertically slidable plate member 8 also carries a bracket 26, Fig. 2. A vertical pivot element 27 that is supported on the bracket 26 serves as a pivotal support for the arms 28 of the holders 29 of the sections of a plural cavity neck mold, generally indicated at 30.

The upper end portion of the slide plate 8 is provided with an outwardly extending bracket 31 carrying an arm 32 on which is supported a vertical cylinder 33. A reciprocable piston rod 34 protrudes from the lower end of the cylinder 33 and has its lower end tapered, as indicated at 35, so as to serve as a wedge member. When the piston within the cylinder 33 moves downward from the position shown in Fig. 2, the tapering lower end of the rod 34 will enter the space between upstanding lugs, such as that indicated at 36, on the arms 28 of the holders for the neck mold sections, and will cam such arms apart to open the neck mold. When the piston within the cylinder 33 moves to the upper part of the cylinder, the lower end of the rod 34 is moved above the lugs 36 so that the sections of the neck ring may be closed in any suitable known manner at the proper time in the cycle of rotation of the table 1. This may be done by having portions of the sections of the parison body mold or projections thereon contact with the open sections of the neck mold as the parison body mold sections are moved to their closed positions so as to effect closing of the neck mold.

The bracket 31 may carry an arm 37 which supports a multiple head unit 38 above and in substantial fluid tight contact with the closed plural cavity neck mold. The multiple head unit 38 may be adapted to apply suction and positive pressure at appropriate different times to the cavities of the neck mold and through such cavities to the cavities of the parison body molds or to the glass therein.

The slide plate 8 is raised and lowered at the proper times in the cycle of rotation of the table 1 by suitable mechanism which may comprise a horizontal pressure fluid cylinder 39 on an inwardly extending arm of a bracket 40 that is carried by the upper portion of the supporting member 6. A piston 41 is reciprocable in the cylinder 39 and has its piston rod 42 pivotally connected by a link 43 with one arm 44 of the bell crank lever 45 that is fulcrumed on a horizontal pivot element 46. The latter may be carried by an upstanding portion of the bracket 40. The bell crank lever 45 has its other arm, indicated at 47, connected by an adjustable link structure with the upper end portion of the vertically slidable plate 8. This adjustable link structure may comprise a link member 48 pivotally connected at its lower end at 49 with the slide plate 8 and having an enlarged body portion provided with a vertical slot 50 in which a block 51 is slidably disposed. The block 51 is pivotally connected at 52 with the arm 47 of the bell crank lever 45. An adjusting screw 53 is threaded through the upper end portion of the link member 48 and bears at its lower end against the top of the block 51. By turning the adjusting screw 53, the effective length of the link structure 48—51 may be varied and the vertical path of reciprocation of the plate 8 and of the parts carried thereby thus correspondingly changed. A lock nut 54 may be provided on the adjusting screw 53 to prevent accidental turning of the latter from adjusted position. When the piston 41 is at the limit of its movement toward the axis of rotation of the table 1, as shown in Fig. 2, the slide plate 8 and the parts carried thereby are in lowered position, which in Fig. 2 is a position suitable to permit the transfer of glass parisons to the finishing molds in a manner to be presently described. This lowered position also will be suitable to permit glass to be gathered by suction into the closed cavities of the parison body molds when the glass receiving and parison forming unit shown in Fig. 2 has been raised and rotated from the position shown in Figs. 1 and 2 to a position over a glass pool (not shown) and has been lowered until the bottom of the parison body mold is in contact with the glass of the pool. When the piston 41 has moved outwardly with respect to the axis of table 1 from the position shown in Fig. 2, the slide plate 8 and the parts carried thereby will be raised. As hereinbefore stated the entire path of vertical movement of the slide plate 8 and of the parts carried thereby may be adjusted vertically within limits by turning the adjusting screw 53. The application and exhaust of pressure fluid to opposite ends of the cylinder 39 at the proper times in the cycle of rotation of table 1 may be controlled in any suitable known manner, no means therefor being shown in the drawings as such means are well known in the art.

The horizontally movable slide plate or carriage 4 on which the parts of the glass receiving and parison forming unit are carried, as hereinbefore described, is provided with two laterally spaced studs 55 and 56, respectively, (Fig. 3) which depend through radial openings 57 and 58, respectively, in the table 1. The lower end portions of these studs carry rollers 59 which travel in a closed cam groove that is formed in a stationary cam plate 60 that surrounds the axis of rotation of the table 1. This cam groove may be concentric with the table 1 for most of the distance around the axis of rotation of the latter, as indicated at 61, but includes a straight portion 62, Fig. 1, that extends parallel with a chord of a circle concentric with the table 1. The opening 58 through which the studs 56 extends is of greater width than the diameter of such stud while the stud 55 carries a roller 63 of sufficient diameter to have a rolling contact with the side walls of the opening 57. Consequently, the plate 4 may oscillate slightly about the axis of the stud 55 as the laterally spaced rollers 59 move from the arcuate portion 61 of the cam groove into and from the straight portion 62 of the cam groove. The plate 4 also will move slightly in a direction radial of the table 1 as the cam rollers 59 traverse the straight portion 62 of the cam groove.

The parts of the machine which are concerned more particularly with the formation of the parisons to finished articles of glassware will now be described. Such apparatus, as illustrated in the drawings, comprises a rotary table 64, for convenience of description called the blow mold table. This table 64 is mounted to rotate about the axis of a vertical column 65 adjacent to the parison mold table 1. Any suitable known means may be employed to rotate the table 64 in synchronism with the table 1 but in the reverse direction as indicated by the arrows in Fig. 1. Fig. 2 shows the hub of the table 64 as being provided with a gear 66 which may be actuated by suitable means, not shown, to effect such rotation.

The table 64 carries blow mold units, indicated generally at B, corresponding in number and relative arrangement on the table 64 with the parison forming units on the table 1. Each of these blow mold units is mounted on a radially movable slide plate or carrier 67 having its inner end enlarged at 68 and disposed beneath a hold down plate 69. The latter surrounds the post or column 65 and may be arranged to rotate in unison with the table 64. A pair of transversely spaced studs 70 and 71 corresponding to the studs 55 and 56, respectively, of the parison forming structure, depend from the plate 67 through radial openings 72 and 73, respectively, in the table 64 and carry rollers 74 which travel in a cam groove. This cam groove is formed in a stationary plate 75 that encircles the axis of rotation of the table 64 and is similar to the hereinbefore described cam groove 61—62 in that it comprises a major portion 76 that is concentric with the table 64 and a substantially straight portion 77 adjacent to and parallel with the straight portion 62 of the cam groove 61—62. The radial opening 73 is of greater width than the stud 71 while the stud 70 is provided with a roller 78 that engages the side walls of the radial opening 72. Thus, the slide plate 67 may oscillate about the axis of the stud 70 slightly as the transversely spaced rolls 74 on the studs 70 and 71 pass from the arcuate portion 76 to the straight portion 77 of the cam groove and from the straight portion 77 of such cam groove into the arcuate portion thereof.

The plate 67 carries an upstanding pivot element 79 on which the arms of holders 80 for the halves of a plural cavity finishing mold, generally indicated at 81, are mounted. These holders 80 are connected by links 82 with the extremities of divergent arms 83 of a cross head 84 that is carried by the outer end of a piston rod 85. The piston rod 85 protrudes from the outer end of a cylinder 86 that is carried by an upstanding bracket or supporting member 87 on the slide plate 67. The inner end of the piston rod 85 is connected with a piston 88 that is reciprocable in the cylinder 86 and the cross head 84 thus may be reciprocated radially at the proper times to effect opening and closing of the halves of the plural cavity blow mold.

The table 64 may be connected by the standards or vertical connecting rods 89 with an upper rotary plate or spider 90 that rotates about the axis of the column 65 in unison with the table 64. This plate 90 may have a pair of downwardly turned radial flanges 91 and 92, respectively, on each portion thereof that is located above a blow mold unit as shown in Fig. 4. A radially extending fluid pressure cylinder 93 may be supported between these flanges, as by being secured to one or both of them. The piston within such cylinder has a rod 94, Fig. 2, protruding from the outer end of the cylinder and provided with teeth 95 in the upper edge of a portion thereof. The toothed portion of the rod 94 thus constitutes a rack that engages the pinion 96 on a horizontal shaft 97 that is carried by suitable bearings in lugs depending from the plate 90. A larger gear 98 on the shaft 97 engages the teeth in the lower surface of a radially slidable plate 99. The plate 99 is mounted in a radial guideway 100 on the plate 90, being retained therein by the strips 101. The plate 90 has a radial slot formed therein to permit the gear 98 to mesh with teeth on the under side of a longitudinal portion of the slide plate 99. A horizontal rock shaft 102 is journaled in bearings on lugs 103 on the slide plate 99. An outwardly extending rocker arm 104 carries a pair of blow heads 105. A rocker arm 106 extends in a generally inward direction from the rock shaft 102 at an oblique angle to the arm 104 and has forks 107 arranged to straddle a rod 108 that is pivoted at its lower end to ears 109 which are upstanding on the slide plate 99. An expansion spring 110 is disposed on the rod 108 between the forked end 107 of the rocker arm 106 and an adjustable stop, as the nut and washer arrangement 111 on the upper end of the rod 108. The spring 110 normally acts to maintain the rocker arm 104 in its outwardly and upwardly inclined position, as shown in Fig. 2, so that the lower ends of the blow heads 105 will be above the plane of the upper ends of the sections of the associated blow mold. The piston within the cylinder 93 is shown in Fig. 2 in its outer position. Pressure fluid may be admitted to and exhausted from the opposite ends of the cylinder 93 by any suitable means, none being shown. When pressure fluid is admitted to the outer end of the cylinder 93 the consequent inward movement of the piston in such cylinder will cause turning of the pinions 96 and 98 in the direction required to cause the slide plate 99 to move radially outward until the respective blow heads 105 are disposed above the cavities of their associate blow mold. Before the slide plate 99 reaches the limit of its outward movement a rocker finger 112 which projects from the rock shaft 102 downwardly through a slot 113 in the plate 90, (see Figs. 1 and 4) will contact with an adjustable abutment, shown as being a screw 114 that is threaded through a depending lug at the outer end of the slot 113. Further outward movement of the slide plate 99 then will cause rocking of the shaft 102 against the action of the spring 110 as required to swing the rocker arm 104 downwardly to a horizontal position, which position of the rocker arm 104 will dispose the blow heads 105 in fluid tight contact with the upper ends of the cavities of the closed associate blow mold. On return of the piston from the inner end of the cylinder 93 to the position shown in Fig. 2, the spring 110 will be permitted to act to swing the blow heads upwardly from the associate blow mold.

The operation of the specific apparatus that has just been described may be substantially as follows. At the proper place in a cycle of rotation of the table 1, a glass receiving unit comprising the closed parison body mold and the closed neck mold will be charged with molten glass. This may be effected by suction applied by the multiple head unit 38 to the plural cavities of the glass receiving unit when such unit has been lowered in the manner hereinbefore described to the surface of a gathering pool. After the charging of the cavities of the glass receiving unit, the glass receiving unit will be lifted by the mechanism hereinbefore described and after a portion of the cycle of rotation of the table 1 has been effected, positive pressure may be introduced through the head structure 38 to expand the glass within the parison forming units to preliminary shape. As the parison forming unit approaches the position of the right hand unit on the table 1 in Figs. 1 and 2, the sections of the parison body mold will be opened by the operation of the mechanism provided for that purpose, as hereinbefore described, so that the radially spaced parisons indicated at 115 in Fig. 2 will be suspended from the closed neck mold structure. The cam rolls 59 will move from the arcuately curved portion 61 of the associate cam groove into the straight portion 62 of such cam groove as the parisons are brought to the transfer station. At this time, the halves of an open blow mold on the table 64 are moved to position to close about the pendant parisons 115, the rolls 74 which control the movement of the plate 67 on the table 64 moving into the straight portion 77 of the associate cam groove so that the blow mold and neck mold will move in coincident paths during the closing of the sections of the blow mold about the radially spaced parisons. The closing of the blow mold sections will be effected by operation of the pneumatic cylinder 86, piston 88 and connecting parts. After the blow mold has closed about the parisons 115, as shown in Fig. 2, the parison neck mold will be opened to release such parisons. The continued rotation of the tables 1 and 64 will cause both the opened parison neck mold and the preliminary head structure 38 that is carried by the parison mold table to be swung away from the blow mold on the blow mold table. At the proper time, the piston within the cylinder 93 will be actuated to cause outward movement of the slide plate 99 and positioning of the blow heads 105 on the closed plural cavity blow mold so as to permit blowing of such parisons to final form in the blow molds. The parison neck mold and the parison body mold will remain open for a certain time after the transfer has been effected to permit cooling thereof and then will be again closed at the proper time in the cycle of rotation of the table 1 for the reception of further charges of glass.

Since the plural neck mold structure on the parison mold table and the plural cavity blow mold on the blow mold table are moving in the same direction during the transfer of the parisons, such transfer may be effected without distortion of the parisons because of unequal contact with walls of the mold, thereby permitting the proper performance of remaining operations for forming the parisons into articles of glassware of good quality. It is thought that such remaining operations need not be specifically described herein.

Obviously the above described mechanism may be used to advantage in a continuously rotating two-table machine in which plural cavity mold units are not necessarily employed, but in which for some other reason, as for instance, when the machine is used to manufacture oval or panel bottles from parisons of polygonal or non-circular shape in cross section, it is desired to avoid any relative circular movement of the finishing mold and the parison during a transfer operation.

While the operation hereinbefore described has been of mechanism particularly adapted for glass gathering by the suction method, it is obvious that the glass receiving units on the parison mold table may receive their charges in some other known manner, as from suitable automatic charge feeding apparatus or as a result of hand feeding. The parison body mold and/or the neck mold or ring structure may be adapted for inversion so that the mold charges may be dropped into the plural cavities of the inverted blank mold. Such charges then may be compacted in the neck mold or ring and blank mold and a cavity formed in the glass for each article, as by causing the glass to be drawn up around the plunger or forcing a plunger into the glass, by blowing, or by a combination of these operations. Thus, the glass forming operations may be effected by pressing or blowing or by pressing and blowing, particular structural elements of the improved apparatus being modified if required in any suitable known manner to meet the exigencies of particular service requirements without departing from the spirit and scope of the invention, the particular structure shown in the drawings merely being illustrative of one practical embodiment of an invention, the features of which are susceptible of modification as to structure, combination and arrangement to adapt the invention to different uses or different conditions of service.

I claim:

1. In glass fabricating apparatus, a traveling glass receiving unit having radially spaced plural cavities, each adapted to receive and impart a preliminary shape to glass for an article of glassware, a traveling plural cavity finishing mold, means for supporting and continuously rotating said glass receiving unit and said finishing molds about eccentric axes, and means for effecting transfer of the preliminarily shaped glass from the cavities of said glass receiving unit to the cavities of said finishing mold during the travel of said glass receiving unit and said finishing mold, including transfer devices, and means for continuously rotating said devices around one of said axes.

2. In glass fabricating apparatus, a rotary table, unitary means mounted thereon for receiving a plurality of charges of glass and for giving such charges a preliminary shape, a second rotary table adjacent to but eccentric of said first table, a finishing mold mounted on said second table and adapted for the reception of the preliminarily shaped glass from the preliminary shaping means on the first table, means for continuously rotating said tables, and means for controlling said unitary preliminary shaping means and said finishing mold to effect transfer of the preliminarily shaped charges of glass to said finishing mold, during the rotation of said tables.

3. In a two-table glass fabricating machine, a glass receiving and parison forming unit including parison and neck molds having plural cavities, each cavity adapted for the reception of sufficient glass for an article of glassware, said unit being mounted on a continuously rotating table, means for movably supporting said neck mold on said table, a blow mold movably mounted on a second continuously rotating table, said blow mold having plural cavities for the reception of the parisons from said unit, and means for controlling the relative movements of said neck mold and said blow mold on their respective tables to cause said neck mold and said blow mold to travel while held in vertical alignment for a sufficient part of the cycles of rotation of said tables to permit the transfer of the parisons from said unit to said blow mold.

4. In a continuously rotating two-table glass fabricating machine, a glass receiving and parison forming unit movably mounted on one of said tables and adapted to receive a plurality of glass charges and to form them into parisons during part of a cycle of rotation of said table, a blow mold movably mounted on the second table and having cavities adapted for the reception of said parisons, and means for bodily moving said unit and blow mold on their respective tables for effecting the transfer of said parisons simultaneously from the parison forming means on said first table to the blow mold on said second table.

5. In a continuously rotating two-table glass fabricating machine, a glass receiving and parison forming unit comprising a parison body mold and a neck mold mounted on one table, means for independently opening said parison body mold and said neck mold, a blow mold movably mounted on the other table, means for axially aligning the neck mold and blow mold, and means for effecting movements of said neck mold and said blow mold on their respective tables to cause said glass receiving and parison forming unit and said blow mold to travel in substantially straight paths during part of the cycles of rotation of said tables, while said neck mold and blow mold are held in axial alignment.

6. In a continuously rotating two-table glass fabricating machine, a glass receiving and parison forming unit comprising cooperative plural cavity parison body and neck molds movably mounted on one of said tables, a plural cavity blow mold movably mounted on the second table, means for opening said parison body mold when parisons have been formed therein to leave said parisons suspended from the neck mold, means for closing said plural cavity blow mold about said suspended parisons, means for causing said suspended parisons and said blow mold to travel in the same direction and to cause said parisons to be moved in vertical alignment with the cavities of the blow-mold, during the closing of said blow mold about said parisons and means for opening said neck mold to permit said parisons to travel thereafter in said closed blow mold.

7. In glass fabricating apparatus, two adjacent rotary tables, a carrier disposed on one of said tables for travel therewith and for limited radial and oscillatory movements thereon, a stationary closed cam track beneath said table, a pair of transversely spaced cam rolls depending from said carrier and traveling in said cam track, a plural cavity glass receiving and parison forming unit mounted on said carrier, a carrier disposed on said second table for travel therewith and for limited radial and oscillatory movements thereon, a closed cam track beneath said second table, a pair of transversely spaced cam rolls depending from said carrier into said second named cam track for travel on the latter, a plural cavity blow mold on said second named carrier, said cam tracks being shaped to cause travel of said glass receiving and parison forming unit and said blow mold in the same direction for a sufficient distance to permit the transfer of parisons from the parison forming unit to the cavity of said blow mold during rotation of said tables.

8. In a glass shaping machine, a traveling unit having separable body and neck portions and adapted to receive a plurality of glass charges and to give such charges a preliminary shape, means for removing the body portion of said unit, leaving the preliminarily shaped glass suspended from such neck portion, a traveling divided finishing mold having cavities for the reception of such preliminarily shaped glass, means for continuously rotating said unit and said finishing mold in eccentric paths, means for controlling the movements of the neck portion of said unit and said finishing mold to permit said finishing mold to be closed about said preliminarily shaped glass and to travel with said neck portion during part of its cycle movement, and means for removing said neck portion from the glass in the finishing mold.

9. In glass shaping apparatus, a rotary table having a pair of spaced radial slots formed therein, a movable plate disposed on such table, a pair of studs depending from said plate respectively through said radial slots, a roller on one of said studs in contact with the side walls of the slot through which it depends, the other of said studs being spaced from the side walls of its slot, a closed cam track beneath said table, said cam track being a portion concentric with the table and another portion extending in a substantially straight line, rollers on said studs traveling in said cam track, glass receiving and parison forming unit mounted on said plate, a second rotary table, and a finishing mold mounted on said second rotary table for receiving a parison from said unit during the travel of said rollers along the straight portion of said cam track.

10. In glass shaping apparatus, a rotary table, a plural cavity divided blow mold mounted thereon, a radially movable slide plate carried above said table and connected to travel with said table about the axis of the latter, means for reciprocating said slide plate radially, an arm pivoted to oscillate about a horizontal axis located above the level of said blow mold, plural blow heads carried by said arm, yielding means tending to actuate said arm to maintain said blow heads above the level of said plural cavity blow mold, and means actuated automatically as the result of a predetermined outward movement of said slide plate to overcome said yielding means and swing said arm downwardly to position said blow heads in operative relation with the cavities of said blow mold.

11. The method of forming hollow glassware which comprises forming a plurality of radially spaced parisons simultaneously in a plural cavity glass receiving and parison forming unit while such unit is traveling in a closed path, continuously rotating a plural cavity finishing mold unit in a different closed path, transferring said parisons simultaneously to plural cavities of the traveling finishing mold unit during the continued travel of said parison forming unit, releasing the parisons in said finishing mold unit prior to blowing them therein, and subsequently blowing the parisons to final shape in the finishing mold unit while the rotation of said units is continued.

12. In a glassware fabricating machine, a pair of carriers mounted side by side for continuous rotation, a parison mold mounted on one of said carriers and a blow mold mounted on the other of said carriers, means for forming a parison in the parison mold, means for opening and closing the parison mold, means on the parison mold carrier for supporting the parison when said parison mold is open, means for opening and closing the finishing mold, and means for causing the supported parison and the finishing mold to travel during a transfer of the parison from the supporting means to the blow mold in coincident straight paths perpendicular to the radii of the tables at the point at which the tables are most nearly tangent.

13. The method of forming hollow glassware which comprises continuously rotating plural parison molds and plural associated neck molds about one axis, simultaneously forming parisons in said parison molds and neck molds, continuously rotating a plural finishing mold about a different axis, simultaneously transferring the previously formed parisons directly from the neck molds to the finishing molds and releasing the parisons therein prior to blowing, while said molds are being rotated, and simultaneously blowing the parisons to final shape in the finishing molds after the transfer of the parisons is completed, and while the rotating of the finishing molds is continued.

14. The method of forming hollow glassware which comprises continuously rotating a multiple parison shaping unit about one axis in one direction, continuously rotating a multiple finishing mold unit about a different axis in a different direction, forming a plurality of parisons in the parison shaping means, transferring the parisons directly from the parison shaping means to the multiple finishing mold unit while holding them out of chilling contact with other instrumentalities and by positively holding the parisons in axial alignment with the multiple finishing mold cavities while the multiple finishing mold is closed about the parisons to insure centering of the parisons in the mold cavities, releasing the parisons in the multiple finishing mold unit after the latter is closed and prior to blowing the parisons therein, and subsequently blowing the parisons to final shape in the multiple finishing mold unit, all of said operations being effected while the molds are being moved.

15. A glassware forming machine comprising a parison mold table, a parison mold thereon, a finishing mold table eccentric to said parison mold table, a finishing mold on the finishing mold table, means for continuously rotating said tables, means for supplying glass to said parison forming mold and for forming a parison therein, means for opening the parison mold, parison supporting means carried by the parison mold table for holding the parison suspended when the parison mold opens, means for moving the parison supporting means, the bare parison suspended therefrom and the finishing mold through a transfer zone in paths in which the axes of the parison supporting means, the parison, and of the cavity of the finishing mold are substantially coincident, means for holding the parison supporting means and finishing mold against relative rotary movement about their substantially coincident axes, at a time during the travel thereof in the transfer zone, means for closing the finishing mold about the bare parison at such time, and means for releasing the parison in the finishing mold.

16. A glassware forming machine comprising a mold table mounted for rotation about a vertical axis, means for continuously rotating said table, a mold thereon, means for successively shaping articles of glassware in said mold, means for successively removing said articles in neck-up position from said mold including ware-holding means by which said articles are held suspended, means for successively causing said ware-holding means to travel in vertical alignment with the mold while said unit is moving, and means for successively moving said ware-holding means and ware suspended therefrom in a rectilinear path to deliver the ware suspended therefrom at the desired place.

17. A glassware forming machine comprising a parison mold table, a parison mold thereon, a finishing mold table eccentric to said parison mold table, a finishing mold on the finishing mold table, means for continuously rotating said tables, means for supplying glass to said parison mold and for forming a parison therein, parison transfer means carried by and movable with one of said tables, means for moving the parison transfer means into vertical axial alignment with the mold on the other table and for causing it to travel in such alignment through a transfer zone, and means for holding the parison transfer means and the mold with which it moves in alignment against relative rotary movement about their substantially coincident axes during the travel thereof in the transfer zone.

Signed at Hartford, Connecticut, this 25th day of February, 1929.

ROBERT W. CANFIELD.